Oct. 20, 1936.　　A. F. METZGER　　2,058,339
DYNAMO-ELECTRIC MACHINE
Filed Sept. 12, 1935
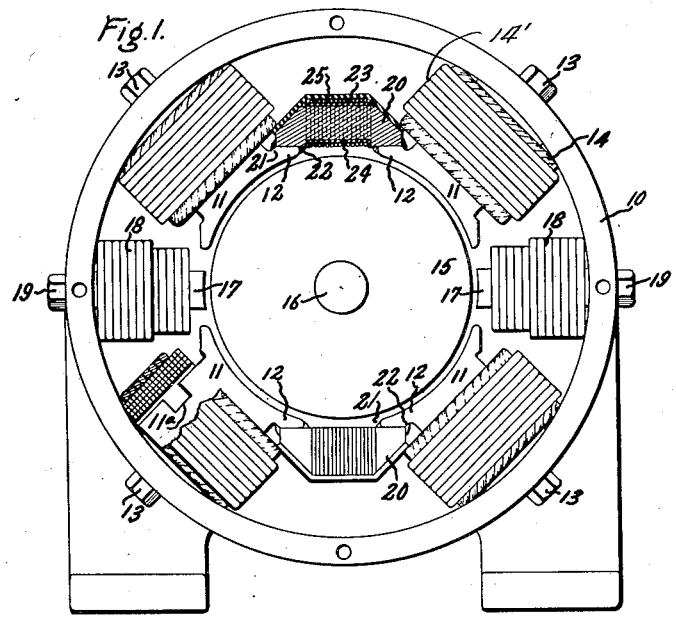
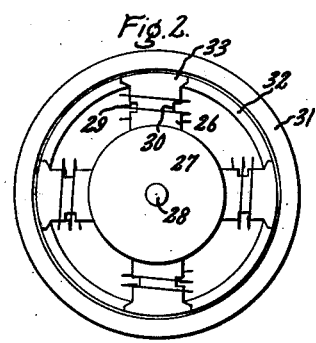
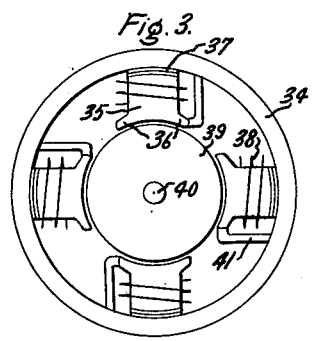
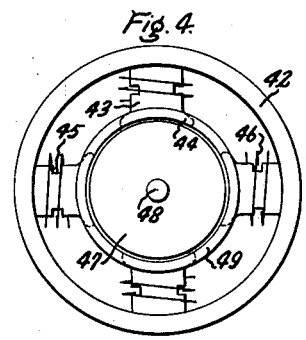
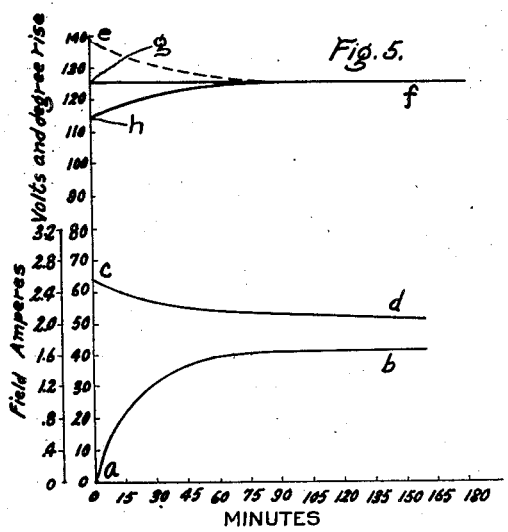
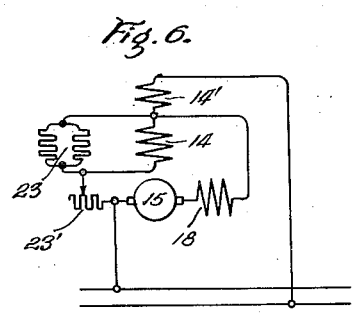
Inventor:
Alan F. Metzger,
by Harry E. Dunham
His Attorney.

Patented Oct. 20, 1936

2,058,339

UNITED STATES PATENT OFFICE 2,058,339

DYNAMO-ELECTRIC MACHINE

Alan F. Metzger, Swampscott, Mass., assignor to General Electric Company, a corporation of New York Application September 12, 1935, Serial No. 40,262

12 Claims. (Cl. 171—223)

My invention relates to dynamo-electric machines and more particularly to an improved construction of a magnetic field structure for such machines.

In certain types of dynamo-electric machines, it is desirable that the magnetic flux traversing the air gap between that portion of the magnetic circuit of the machine with which the magnetic field set up by the field structure of the machine reacts and the field structure, should remain substantially constant. In a battery charging generator, for example, the generator voltage should remain substantially constant, and the flux produced by the field structure across the air gap of the generator determines the regulation of the machine, other factors remaining constant. Another example is, where it is desired that the operating speed of an electric motor shall remain substantially constant, and where the speed is determined by the air gap flux, other factors remaining constant. The regulation of the air gap flux generally has been controlled by a variation in the excitation of the magnetic field to compensate for variations in the resistance in the field exciting windings however, such systems have the general disadvantage of requiring a separate mechanism for controlling such excitation.

An object of my invention is to provide an improved magnetic field structure which will inherently compensate for the effect of temperature variations upon the operating characteristics of a dynamo-electric machine. I accomplish this by providing a magnetic field structure in which a thermo-magnetic shunt is arranged to vary the air-gap flux, depending upon the temperature of the shunt. Preferably, this shunt is arranged between the main pole faces or between the pole faces and the frame to provide a complete magnetic circuit, the reluctance of which is varied by the shunt, dependent upon the temperature of the field structure or of the field excitir ; windings. The temperature of the shunt may be varied by thermal conduction from the magnetic field structure and radiation from the field exciting windings or by, a heating element, such as a heating coil. Various magnetic alloys may be utilized which have the characteristic of changing their magnetic reluctance with temperature variations, such as a ferro-nickel alloy of approximately 70% iron and 30% nickel, and it is desirable that the demagnetizing and remagnetizing hysteresis curves of such an alloy be close together for obtaining consistent results. Thus, the proper heating arrangement and choice of alloy provides for various compensating and compounding air gap magnetic effects. It is readily seen that with a temperature rise, a thermo-magnetic shunt may be made to increase its reluctance to such an extent that the decrease in the excitation of the field structure, due to the decrease in field current resulting from increased field resistance, will be compensated by the decrease in flux shunted from the air gap through the thermo-magnetic shunt. Also, if it is desired to have a rising or drooping characteristic with temperature changes, the thermo-magnetic reluctance characteristic of the shunt or the heating arrangement utilized may be varied to provide for a more rapid or slower increase, respectively, in the reluctance of the shunt. Various characteristics can also be obtained by utilizing shunts of different transverse areas for varying the effect of magnetic saturation on the shunt. I also have found it desirable to provide a magnetically saturated section in the standard magnetic field structure, so that the total reluctance of the magnetic circuit will not be affected materially by the insertion of the shunt.

My invention will be more fully set forth in the following description referring to the accompanying drawing and the features of novelty characterizing my invention will be pointed out with particularity in the claims annexed to and forming a part of this specification.

For a better understanding of my invention, reference is made to the accompanying drawing, wherein Fig. 1 is a front view of a dynamo-electric machine embodying my invention, in which thermo-magnetic shunts are arranged between adjacent main pole faces of a stationary magnetic field structure; Fig. 2 schematically illustrates a dynamo-electric machine wherein shunts, similar to those in Fig. 1, are employed in connection with a rotating magnetic field structure; Fig. 3 illustrates another embodiment of my invention wherein thermo-magnetic shunts are arranged between field pole faces and the magnetic frame of the machine; Fig. 4 illustrates another embodiment of my invention wherein thermo-magnetic shunts are arranged completely around the air gap and bridge the entire field structure; Fig. 5 is a diagram illustrating the generated voltage characteristics of a generator with and without the use of thermo-magnetic field shunts, and the field current and temperature rise characteristics of the field structure of the machine, and Fig. 6 is a schematic diagram illustrating the electrical connections of the dynamo-electric machine shown in Fig. 1.

Referring to the drawing, the embodiment of my improved dynamo-electric machine field structure, shown in Fig. 1, comprises a stationary frame 10 provided with four main field poles 11 having pole faces 12 and are secured to the frame by bolts 13. The desired excitation of this field structure is provided by shunt field exciting windings 14 and series field exciting windings 14' mounted on the main poles 11 and energized in any suitable manner. The dynamo-electric machine is provided with a rotating member having a magnetic core structure 15 mounted upon a rotatable shaft 16 and is arranged in spaced relation to said pole faces 12 to provide an air gap therebetween. To improve the commutation of this machine, commutating poles 17, suitably excited by commutating field exciting windings 18, are mounted upon the frame by bolts 19.

The air-gap flux is regulated by thermo-magnetic shunts 20, welded at 21 and 22 to the pole faces in order to provide good thermal contact between the shunts and the field structure, so that the temperature of the thermo-magnetic shunts will vary with the temperature of the remainder of the field structure. To insure prompt response to the temperature variations of the field exciting windings 14, heating coils 23 are arranged around the central portion of the thermo-magnetic shunts and electrically insulated therefrom by insulating coverings 24. The exterior of these heating coils is protected by another insulating covering 25 arranged over the entire outer surface of the thermo-magnetic shunts 20. The energization of the heaters 23 depends upon the temperature of the field exciting windings 14 and may be controlled in any suitable manner. Since the series field exciting windings 14' generally include only a few turns of very heavy conductors, their heating effect on the field structure is generally small as compared to that of the shunt field exciting windings 14 which usually include a large number of turns of relatively small conductors. In practice, I have found that the connection of the heaters 23 across the shunt field exciting windings 14 and in series with a shunt field rheostat 23', as shown in Fig. 6, is a very satisfactory arrangement for maintaining the thermo-magnetic shunts at substantially the same temperature as that of the field structure. Furthermore, as stated above, the welded connection of the thermo-magnetic shunts to the pole pieces provides a good thermal contact therebetween and, in addition, the same air surrounds the shunts and the pole pieces, so that their dissipation of heat to the surrounding atmosphere is substantially the same under all operating conditions.

A section 11a of the field poles 11 is arranged to have a relatively low saturation point as compared to the remainder of the field structure by forming it of a cross-sectional area less than that of the remainder of the field poles for providing an operatively magnetically saturated section when the field exciting windings 14 are energized. The frame, field poles, and thermo-magnetic shunts form a complete magnetic circuit exclusive of the rotating magnetic core structure 15, and the section of the field pole having a relatively low saturation point is inserted in the field structure, so that the total reluctance of the magnetic circuit will not be affected materially by the insertion of the shunts between the pole faces.

By a proper selection of the material of which the thermo-magnetic shunts are made and of the cross-sectional area of the shunts, the amount of flux diverted from the air gap for a given field temperature may be so regulated that a substantially constant air gap flux will be produced. In Fig. 5, the curve a—b represents the temperature change of the fields of a 125 volt dynamo-electric machine, starting from cold to a substantially constant normal operating temperature of about 40° rise in temperature above ambient, and the curve c—d shows how the field current varies over this range of operation due to the changing resistance of the field exciting windings with the temperature variations of the field. This change in field current in the ordinary machine results in a corresponding change in the excitation of the machine, so that the machine must be regulated for a high terminal voltage when running cold in order to obtain the desired normal operating potential. The curve e—f shows the voltage regulation of a 125 volt generator without the use of my improved field structure, in which it is seen that the terminal voltage varied from approximately 140 volts when cold, to 125 volts when the normal operating temperature was reached. By regulating the air gap flux of the machine in accordance with my invention I have found that the terminal voltage may be maintained substantially constant at 125 volts, as shown by the curve g—f. I have also found that the voltage of a generator, provided with properly selected shunts made according to this invention, may be given a rising characteristic from cold to normal operating temperature, as indicated by the curve h—f.

My invention may also be utilized in connection with a rotating field structure, as illustrated in Fig. 2, wherein field poles 26 are mounted upon a magnetic core 27 suitably supported by a rotatable shaft 28. These field poles are excited by field exciting windings 29 energized in any suitable manner. A section 30 of the field poles 26 is arranged to have a relatively low saturation point by being formed of a cross-sectional area less than the remainder of the pole structure, and the dynamo-electric machine is provided with a magnetic core structure 31 arranged in spaced relation with the field structure, so as to provide an air gap therebetween. In accordance with my invention, the air gap flux is regulated by thermo-magnetic shunts 32 arranged in good thermally and magnetically conductive relation between the pole faces 33 of the field poles 26.

In the modification of my invention, shown in Fig. 3, a dynamo-electric machine is provided with a frame 34 to which are secured field poles 35 having pole faces 36. A magnetically saturated section is provided in the field structure by arranging shims 37, of a material having a relatively low saturation point as compared to the remainder of the field structure, between the field poles 35 and the frame 34. The field poles 35 are excited by field exciting windings 38 energized in any suitable manner, and the dynamo-electric machine is provided with a rotating magnetic core structure 39 mounted upon a rotatable shaft 40 and arranged in spaced relation with respect to the pole faces 36, so as to provide an air gap therebetween. In accordance with my invention, the air gap flux is regulated by thermo-magnetic shunts 41 arranged in good thermally and magnetically conductive relation between the pole faces 36 and the frame 34.

In the further modification of my invention, shown in Fig. 4, the dynamo-electric machine is provided with a stationary field structure including a frame 42 upon which are mounted field poles 43. These field poles are provided with pole faces 44 and a section 45 having a relatively low saturation point as compared with the remainder of the field poles, by being formed of a cross-sectional area less than the remainder of the pole structure. The field structure is excited by field exciting windings 46, which may be energized in any suitable manner, and the dynamo-electric machine is provided with a rotatable magnetic core structure 47 mounted upon a shaft 48 and arranged in spaced relation with respect to the pole faces 44, so as to provide an air gap therebetween. In accordance with my invention, the air gap flux is regulated by thermo-magnetic shunts 49 arranged completely around the air gap and bridging all of the pole faces 44.

In view of the foregoing description, it will be seen that I have provided a magnetic field structure for a dynamo-electric machine wherein the effect of temperature variations upon the operating characteristics of the machine are inherently compensated, without requiring a separate mechanism for controlling the excitation of the machine.

Modifications of the arrangements, which I have described, will occur to those skilled in the art. I desire it to be understood, therefore, that my invention is not to be limited to the particular embodiments set forth, and I intend in the appended claims to cover all modifications which do not depart from the spirit and scope of my invention.

What I claim as new and desire to secure by Letters Patent of the United States, is:

1. A magnetic field structure for a dynamo-electric machine, a field exciting winding for said field structure, means including a thermo-magnetic shunt in said magnetic field structure for regulating the effect of temperature variations upon the excitation of said field structure, and means dependent upon temperature variations of said field exciting winding including a heating coil for varying the temperature of said thermo-magnetic shunt.

2. A magnetic field structure for a dynamo-electric machine forming a complete magnetic circuit, said magnetic field structure having a magnetically saturable section under normally unsaturated conditions in the main portion of said field structure, a field exciting winding for said field structure, and means dependent upon temperature variations of said field structure for varying the reluctance of said complete magnetic circuit and for regulating the effect of temperature variations upon the excitation of said field structure.

3. A magnetic field structure for a dynamo-electric machine forming a complete magnetic circuit, means including a section of cross-sectional area less than the remainder of said magnetic field structure for providing a magnetically saturable section, a field exciting winding for said field structure, and means dependent upon temperature variations of said field exciting winding for varying the reluctance of said complete magnetic circuit and for regulating the effect of temperature variations upon the excitation of said field structure.

4. A magnetic field structure for a dynamo-electric machine including a frame and a plurality of field poles with faces arranged in circumferentially spaced relation, a field exciting winding for said field structure, and means including thermo-magnetic shunts arranged between said pole faces and said frame for regulating the effect of temperature variations upon the excitation of said field structure.

5. A dynamo-electric machine including a rotatable member having a magnetic core structure, a magnetic field structure arranged in spaced relation to said magnetic core structure to provide an air gap therebetween, means including a field exciting winding for said magnetic field structure for producing a magnetic flux in said air gap, and means dependent upon the temperature variations of said magnetic field structure for regulating the effect of said temperature variations upon the magnetic flux in said air gap.

6. A magnetic field structure for a dynamo-electric machine having a plurality of field poles, said field poles having pole faces arranged in circumferentially spaced relation, a field exciting winding for said field structure, and means including a thermo-magnetic shunt arranged between said pole faces for regulating the effect of temperature variations upon the excitation of said field structure.

7. A magnetic field structure for a dynamo-electric machine including a frame and a plurality of field poles with faces arranged in circumferentially spaced relation, means including a section of magnetic material in said field poles having a relatively low saturation point as compared to the remainder of said field structure, a field exciting winding for said field structure, and means including thermo-magnetic shunts arranged between said pole pieces and said frame for regulating the effect of temperature variations upon the excitation of said field structure.

8. A dynamo-electric machine including a rotatable member having a magnetic core structure, a magnetic field structure forming a complete magnetic circuit and arranged in spaced relation with said magnetic core structure to provide an air gap therebetween, said magnetic field structure having a magnetically saturable section under normally unsaturated conditions in the main portion of said field structure, means including a field exciting winding for said magnetic field structure for producing a magnetic flux in said air gap, and means dependent upon temperature variations of said field structure for varying the reluctance of said complete magnetic circuit and for regulating the effect of temperature variations in said dynamo-electric machine upon the magnetic flux in said air gap.

9. A dynamo-electric machine including a rotatable member having a magnetic core structure, a magnetic field structure forming a complete magnetic circuit and arranged in spaced relation with said magnetic core structure to provide an air gap therebetween, means including a section in said magnetic field structure of cross-sectional area less than the remainder of said magnetic field structure for providing a magnetically saturable section under normally unsaturated conditions in the main portion of said field structure, means including a field exciting winding for said field structure arranged to produce a magnetic flux in said air gap, and means dependent upon temperature variations of said field exciting windings for varying the reluctance of said complete magnetic circuit and for regulating the effect of said temperature variations upon the magnetic flux in said air gap.

10. A dynamo-electric machine including a rotatable member having a magnetic core structure, a magnetic field structure arranged in spaced relation to said magnetic core structure to provide an air gap therebetween, means including a field exciting winding for said magnetic field structure for producing a magnetic flux in said air gap, means including a thermo-magnetic shunt in said magnetic field structure for regulating the effect of temperature variations in said dynamo-electric machine upon the magnetic flux in said air gap, and means dependent upon temperature variations of said field exciting windings for varying the temperature of said thermo-magnetic shunt.

11. A dynamo-electric machine. including a rotatable member having a magnetic core structure, a magnetic field structure forming a complete magnetic circuit and arranged in spaced relation with said magnetic core structure to provide an air gap therebetween, means including a section in said magnetic field structure of cross-sectional area less than the remainder of said magnetic field structure for providing a magnetically saturatable section under normally unsaturated conditions of the main portion of said field structure, means including a field exciting winding for said field structure for producing a magnetic flux in said air gap, means including a thermo-magnetic shunt in said magnetic field structure for regulating the effect of temperature variations of said dynamo-electric machine upon the magnetic flux in said air gap, and means dependent upon temperature variations of said field exciting winding and including heating means for varying the temperature of said thermo-magnetic shunt.

12. A dynamo-electric machine including a rotatable member, a stationary magnetic member including a frame and a plurality of field poles with faces arranged in spaced relation with respect to said rotatable member to provide an air gap therebetween, means including a section of material in said field poles having a relatively low saturation point as compared to the remainder of said stationary magnetic member for providing a magnetically saturatable section, means including a field exciting winding for said stationary member for producing a magnetic flux in said air gap, and means including thermo-magnetic shunts arranged between said pole-pieces and said frame for regulating the effect of temperature variations of said dynamo-electric machine upon the magnetic flux in said air gap.

ALAN F. METZGER.